United States Patent
Ramanathan et al.

(10) Patent No.: US 8,863,506 B2
(45) Date of Patent: Oct. 21, 2014

(54) OPTIMIZED ELECTRICALLY HEATED EXHAUST GAS TREATMENT SYSTEM

(75) Inventors: Karthik Ramanathan, Karnataka (IN); Se H. Oh, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1037 days.

(21) Appl. No.: 12/908,229

(22) Filed: Oct. 20, 2010

(65) Prior Publication Data

US 2012/0096834 A1  Apr. 26, 2012

(51) Int. Cl.
  *F01N 3/10* (2006.01)
  *F01N 3/00* (2006.01)
  *F01N 3/20* (2006.01)

(52) U.S. Cl.
  CPC .............. *F01N 3/2013* (2013.01); *Y02T 10/26* (2013.01)
  USPC .................... 60/300; 60/284; 60/299; 60/303

(58) Field of Classification Search
  USPC ......... 60/274, 284, 299, 300, 303; 73/114.69, 73/114.71
  See application file for complete search history.

(56) References Cited

U.S. PATENT DOCUMENTS

| 5,966,931 A | 10/1999 | Yoshizaki et al. |
| 6,869,573 B2 * | 3/2005 | Abe et al. ............ 422/180 |
| 8,209,970 B2 | 7/2012 | Gonze et al. |

FOREIGN PATENT DOCUMENTS

CN  101306685 A  11/2008

* cited by examiner

*Primary Examiner* — Thomas Denion
*Assistant Examiner* — Diem Tran
(74) *Attorney, Agent, or Firm* — Quinn Law Group, PLLC

(57) ABSTRACT

A method of sizing a light-off core supporting a fixed quantity of a light-off catalyst for an exhaust gas treatment system having an electric heater upstream of the light-off catalyst for heating the exhaust gas includes measuring the cumulative hydrocarbon or carbon monoxide emissions leaving the exhaust gas treatment system for multiple volumetric sizes of the light-off core in accordance with a heating strategy. Alternatively, a model of the treatment system may be used to predict the cumulative hydrocarbon or carbon monoxide emissions. The method further includes selecting the volumetric size of the light-off core that is associated with the lowest cumulative hydrocarbon or carbon monoxide emissions level from the measured or predicted hydrocarbon or carbon monoxide emissions when the exhaust gas is heated in accordance with the heating strategy. The heating strategy may include pre-crank heating, post-crank heating, or a combination of pre-crank heating and post crank heating.

16 Claims, 2 Drawing Sheets

OPTIMIZED ELECTRICALLY HEATED EXHAUST GAS TREATMENT SYSTEM

TECHNICAL FIELD

The subject invention generally relates to a method of treating a flow of exhaust gas from an internal combustion engine.

BACKGROUND

Vehicles with an Internal Combustion Engine (ICE) are equipped with a treatment system for reducing the toxicity of the exhaust gas from the engine. The treatment system typically includes a main catalytic converter, which includes a main catalyst that reduces nitrogen oxides in the exhaust gas to nitrogen and carbon dioxide or water, as well as oxidizes carbon monoxide (CO) and unburnt hydrocarbons (HCs) to carbon dioxide and water. However, the main catalyst must be heated to a light-off temperature of the main catalyst before the main catalyst becomes operational. Accordingly, the exhaust gas must heat the main catalyst to the light-off temperature of the main catalyst before the reaction between the main catalyst and the exhaust gas begins. The majority of the pollutants, particularly the majority of the CO and HCs emitted during the operation of the engine, occur prior to the main catalyst reaching the light-off temperature.

In order to speed the heating of the main catalyst to the light-off temperature and reduce the pollutants emitted prior to the main catalyst reaching the light-off temperature, the exhaust gas treatment system may include a light-off catalyst that is disposed upstream of the main catalyst. The light-off catalyst, due to a high Platinum Group Metal (PGM) content, readily promotes exothermic reactions, such as the oxidation of the CO and HCs to generate additional heat, which is transferred to the main catalyst to reduce the time to heat the main catalyst to the light-off temperature.

Additionally, some vehicles may include an exhaust gas heater, such as but not limited to an electric heater, to further heat the exhaust gas to reduce the time to heat the main catalyst to the light-off temperature. In conventional vehicles that are only powered by the ICE, the exhaust gas heater is limited to heating the exhaust gas only after the engine is started, i.e., post crank heating. In hybrid vehicles that further include an ICE/electric motor combination for powering the vehicle, the hybrid vehicle may power the exhaust gas heater with a battery prior to starting the engine, i.e., pre-crank heating, thereby further increasing the amount of heat supplied to the exhaust gas heater and reducing the time to heat the main catalyst to the light-off temperature once the engine is started.

SUMMARY

A method of treating a flow of exhaust gas from an internal combustion engine of a vehicle is provided. The method includes heating the exhaust gas with an electric heater in accordance with a heating strategy. The method further includes exothermically oxidizing carbon monoxide and hydrocarbons in the exhaust gas with a pre-determined quantity of a light-off catalyst disposed downstream of the electric heater to generate heat. The method further includes treating the exhaust gas with a main catalyst disposed downstream of the light-off catalyst to reduce the toxicity of the exhaust gas, and sizing a light-off core supporting the pre-determined quantity of the light-off catalyst. The light-off core is sized to minimize toxic emissions in the exhaust gas when the exhaust gas is heated in accordance with the heating strategy.

A method of sizing a light-off core for supporting a fixed quantity of a light-off catalyst of an exhaust gas treatment system is also provided. The method includes heating the exhaust gas upstream of the light-off core with an electric heater in accordance with a heating strategy. The method further includes measuring the cumulative toxic emissions leaving the treatment system for various volumetric sizes of the light-off core when the exhaust gas is heated in accordance with the heating strategy. The method further includes selecting the volumetric size of the light-off core that is associated with the lowest cumulative toxic emission level from the measured cumulative toxic emissions at the various volumetric sizes of the light-off core.

A method of sizing a light-off core for supporting a fixed quantity of a light-off catalyst of an exhaust gas treatment system is also provided. The method includes heating the exhaust gas upstream of the light-off core with an electric heater in accordance with a heating strategy. The method further includes modeling the operation of the gas treatment system to predict the cumulative toxic emissions leaving the treatment system for various volumetric sizes of the light-off core, when the exhaust gas is heated in accordance with the heating strategy. The method further includes selecting the volumetric size of the light-off core that is associated with the lowest cumulative toxic emission level obtained from the model solving for the cumulative toxic emissions for the various volumetric sizes of the light-off core.

Accordingly, the size of the light-off core, which supports the light-off catalyst, is optimized for the heating strategy to minimize the toxic emissions, including but not limited to carbon monoxide emissions and hydrocarbon emissions, from the exhaust gas. Optimizing the size of the light-off core to maximize the efficiency of the exhaust gas treatment system is particularly important in hybrid vehicles that may pre-heat the electric heater prior to starting the internal combustion engine.

The above features and advantages and other features and advantages of the present invention are readily apparent from the following detailed description of the best modes for carrying out the invention when taken in connection with the accompanying drawings.

DETAILED DESCRIPTION

Figure 1:
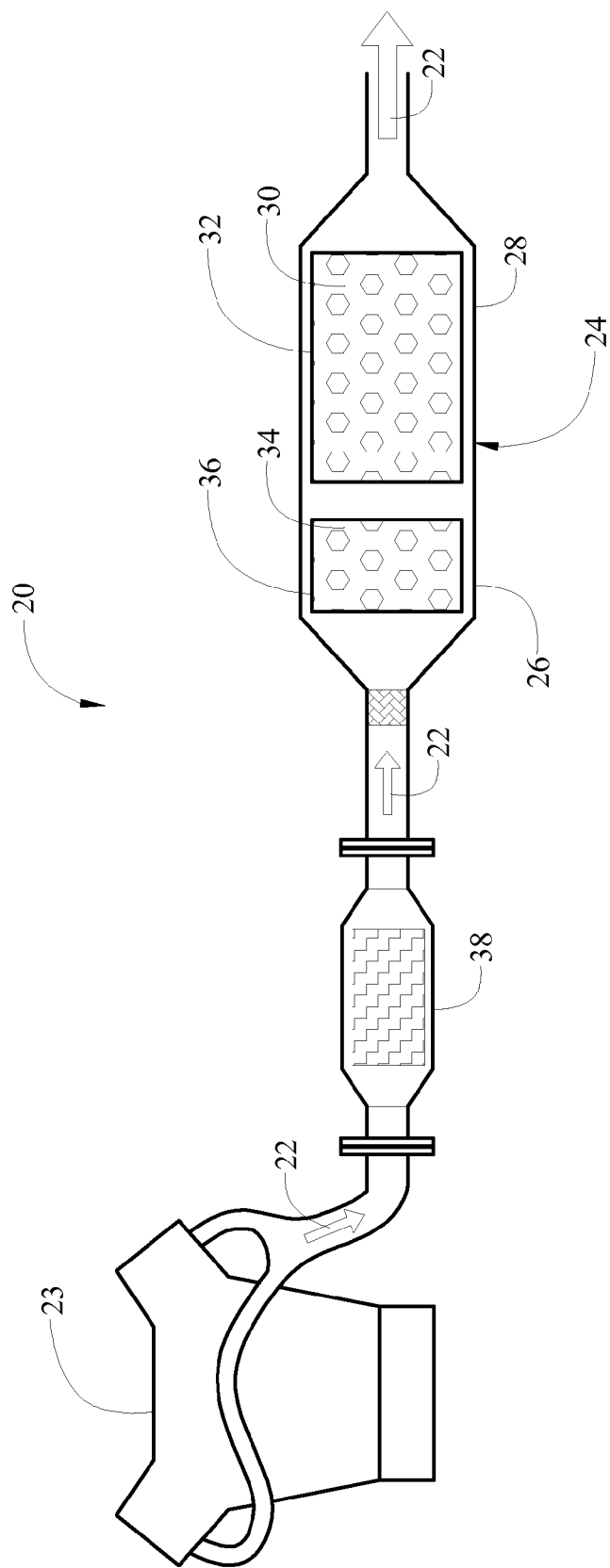
FIG. 1 is a schematic plan view of an exhaust gas treatment system.

Referring to FIG. 1, wherein like numerals indicate like parts throughout the several views, an exhaust gas treatment system is shown generally at 20. The treatment system 20 treats a flow of exhaust gas, indicated by arrow 22, from an Internal Combustion Engine (ICE) 23 to reduce the toxicity of the exhaust gas.

The treatment system 20 includes a main catalytic converter 24. The main catalytic converter 24 is disposed downstream of the engine 23. The main catalytic converter 24 may include, but is not limited to, a three way catalytic converter. The three way catalytic converter may include Platinum Group Metals (PGM), and converts a percentage of the nitrogen oxides in the exhaust gas into nitrogen and carbon dioxide or water, as well as oxidizes a percentage of the carbon monoxide to carbon dioxide and oxidizes a percentage of the unburnt hydrocarbons to carbon dioxide and water.

The main catalytic converter 24 includes an upstream portion 26 and a downstream portion 28. The downstream portion 28 includes a main catalyst 30 for treating the exhaust gas as described above. A main core 32 is disposed within the downstream portion 28, and supports the main catalyst 30. If the treatment system 20 utilizes only a single main catalytic converter 24, then the main catalyst 30 may be disposed on the main core 32 to define a PGM gradient between an upstream end of the main core 32 and a downstream end of the main core 32. The PGM gradient provides a higher concentration of the main catalyst 30 at the upstream end of the main core 32 and a lower concentration of the main catalyst 30 at the downstream end of the main core 32.

The upstream portion 26 of the main catalytic converter 24 includes a light-off catalyst 34. The light-off catalyst 34 may include, but is not limited to, PGMs as the active component. A light-off core 36 is disposed within the upstream portion 26 of the main catalytic converter 24, and supports the light-off catalyst 34. The light-off catalyst 34 oxidizes the CO and HCs in the exhaust gas exothermally to produce heat, which helps heat the main catalyst 30 to a light-off temperature sufficient to react with the exhaust gas.

The treatment system 20 further includes an exhaust heater 38. The exhaust heater 38 is disposed upstream of the main catalytic converter 24. The exhaust heater 38 heats the exhaust gas prior to the exhaust gas entering the main catalytic converter 24. The exhaust heater 38 may include, but is not limited to, an electric heater 38. While the exhaust heater 38 is hereinafter referred to as the electric heater 38, it should be appreciated that the exhaust heater 38 may include some other device capable of heating the exhaust gas in accordance with a pre-defined heating strategy, described in greater detail below.

The electric heater 38 is powered to heat the exhaust gas in accordance with the heating strategy. If the vehicle is a conventional vehicle powered only by the internal combustion engine 23, then the electric heater 38 is powered by the engine 23 post-crank, i.e., post-crank heating after the engine 23 has started. If the vehicle is a hybrid vehicle powered by either the internal combustion engine 23 and/or a separate ICE/electric motor combination (not shown), then the electric heater 38 may be powered by either the engine 23 or the ICE/electric motor combination. Accordingly, if the vehicle is a hybrid vehicle, the electric heater 38 may be powered by a battery (not shown) pre-crank, i.e., pre-crank heating before the engine 23 is started, and possibly in combination with the engine 23 post-crank. The heating strategy may include a pre-determined amount of time pre-crank heating at a pre-determined power level, a pre-determined amount of time post-crank heating at a pre-determined power level, or a combination of pre-crank heating for a pre-determined amount of time at a pre-determined power level and post-crank heating for a pre-determined amount of time at a pre-determined power level.

Figure 2:
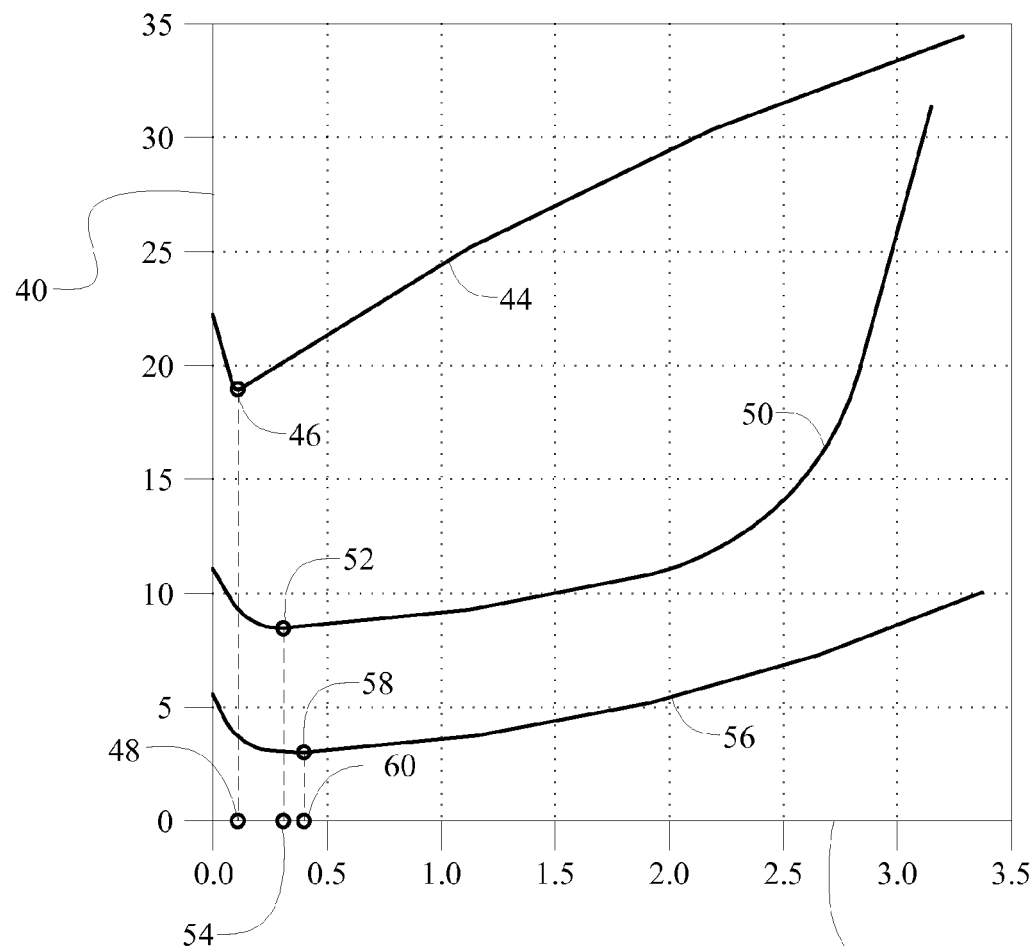
FIG. 2 is a graph showing the relationship between cumulative hydrocarbon emissions leaving the exhaust gas treatment system and the volumetric size of the light-off core.

FIG. 2 shows the cumulative hydrocarbon emissions after 250 seconds of the Federal Test Procedure drive cycle for hybrid vehicles. The Federal Test Procedure drive cycle for hybrid vehicles includes operating the vehicle for one hundred fifty seconds (150 sec) under battery power with the engine 23 turned off, followed by operating the vehicle for one hundred seconds (100 sec) under engine power, i.e., with the engine 23 turned on. While FIG. 2 optimizes the volumetric size of the light-off core 36 to hydrocarbon emissions, it should be appreciated that the volumetric size of the light-off core 36 may be optimized for other toxic emissions, including but not limited to, carbon monoxide emissions. The cumulative hydrocarbon emissions are measured in milligrams per miles (mg/ml) along a vertical axis 40, and the volumetric size of the light-off core 36 is measured in liters (l) along a horizontal axis 42. Referring to FIG. 2, it has been found that the efficiency of a fixed quantity of the light-off catalyst 34 varies with the volumetric size of the light-off core 36 supporting the light-off catalyst 34 at any given heating strategy. If the fixed quantity of the light-off catalyst 34 is applied to the light-off core 36 having a smaller volumetric size, the fixed quantity of the light-off catalyst 34 is disposed on the light-off core 36 at a higher concentration, which produces higher quantities of heat through the exothermic reactions. However, because of the small volumetric size of the light-off core 36, the residence time of the exhaust gas flowing through the light-off core 36 is small, which reduces the time for mass/heat transfer between the light-off catalyst 34 and the exhaust gas. If the fixed quantity of the light-off catalyst 34 is applied to the light-off core 36 having a larger volumetric size, the fixed quantity of the light-off catalyst 34 is disposed on the light-off core 36 at a lower concentration, which produces lower quantities of heat through the exothermic reactions. However, because of the large volumetric size of the light-off core 36, the residence time of the exhaust gas flowing through the light off core is greater, which increases the time for mass/heat transfer between the light-off catalyst 34 and the exhaust gas. Accordingly, there exists an optimum volumetric size for the light-off core 36 at any given heating strategy that minimizes the cumulative toxic emissions.

The additional heat added to the exhaust gas from the electric heater 38 affects the relationship between the cumulative hydrocarbon emissions and the volumetric size of the light-off core 36. Accordingly, the light-off core 36 should be sized according to the specific heating strategy utilized to maximize the efficiency of the system. As shown in FIG. 2, a first relationship between the cumulative hydrocarbon emissions and the volumetric size of the light-off core 36 at a first heating strategy is shown at 44. The first heating strategy includes pre-crank heating the exhaust gas with the electric heater 38 at zero watts (0 w) for one hundred fifty seconds (150 sec), followed by post-crank heating the exhaust gas with the electric heater 38 at fifteen hundred watts (1500 w) for fifty seconds (50 sec). The minimum hydrocarbon emissions level under the first heating strategy is shown at 46, and the optimum volumetric size for the light-off core 36 under the first heating strategy is shown at 48. A second relationship between the cumulative hydrocarbon emissions and the volumetric size of the light-off core 36 at a second heating strategy is shown at 50. The second heating strategy includes pre-crank heating the exhaust gas with the electric heater 38 at nine hundred watts (900 w) for one hundred fifty seconds (150 sec), followed by post-crank heating the exhaust gas with the electric heater 38 at zero watts (0 w) for one hundred seconds (100 sec). The minimum hydrocarbon emissions level under the second heating strategy is shown at 52, and the optimum volumetric size for the light-off core 36 under the second heating strategy is shown at 54. A third relationship between the cumulative hydrocarbon emissions and the volumetric size of the light-off core 36 at a third heating strategy is shown at 56. The third heating strategy includes pre-crank heating the exhaust gas with the electric heater 38 at nine hundred watts (900 w) for one hundred fifty seconds (150 sec), followed by post-crank heating the exhaust gas with the electric heater 38 at fifteen hundred watts (1500 w) for one hundred seconds (100 sec). The minimum hydrocarbon emissions level under the third heating strategy is shown at 58, and the optimum volumetric size for the light-off core 36 under the third heating strategy is shown at 60.

Referring back to FIG. 1, the invention provides a method of treating the flow of exhaust gas from the internal combustion engine 23 of the vehicle. The method includes sizing the light-off core 36 that supports the fixed and pre-determined quantity of the light-off catalyst 34. The light-off core 36 is sized to minimize toxic emissions in the exhaust gas when the electric heater 38 is operating in accordance with a heating strategy. The toxic emissions may include, but are not limited to, hydrocarbon emissions or carbon monoxide emissions. Accordingly, the light-off core 36 is sized to optimize performance and minimize either the hydrocarbon emissions or the carbon monoxide emissions.

Sizing the light-off core 36 includes defining a heating strategy for the Federal Test Procedure. The heating strategy may be defined to include pre-crank heating only, post-crank heating only, or a combination of pre-crank heating and post-crank heating at various power levels and/or time durations.

Sizing the light-off core 36 may further include measuring the cumulative toxic emissions leaving the main catalyst 30 for various volumetric sizes of the light-off core 36 under the defined heating strategy. The measured cumulative toxic emissions may be used to develop a relationship between the cumulative toxic emissions and the volumetric sizes of the light-off core 36 when the exhaust gas is heated in accordance with the defined heating strategy. The relationship between the cumulative toxic emissions and the volumetric size of the light-off core 36 may include "curve fitting" a best fit line through the measured data points relating the cumulative toxic emissions at the various volumetric sizes of the light-off core 36. The best fit line may be expressed graphically such that the lowest toxic emissions level under the defined heating strategy may be visually determined by viewing a graph relating the cumulative toxic emissions and the volumetric sizes of the light-off core 36 when the exhaust gas is heated in accordance with the defined heating strategy.

Sizing the light-off core 36 further includes selecting the volumetric size of the light-off core 36 that is associated with the lowest cumulative toxic emission level from the measured cumulative toxic emissions at the various volumetric sizes of the light-off core 36. Referring to FIG. 2, the lowest cumulative hydrocarbon emission level is shown at markers 46, 52 and 58 for the first relationship 44 under the first heating strategy, the second relationship 50 under the second heating strategy, and the third relationship 56 under the third heating strategy respectively. The size of the light-off core 36 is determined from the lowest level of the cumulative hydrocarbon emissions, as indicated by markers 48, 54 and 60 for the first relationship 44 under the first heating strategy, the second relationship 50 under the second heating strategy, and the third relationship 56 under the third heating strategy respectively.

Alternatively, sizing the light-off core may include modeling the operation of the treatment system. The model of the treatment system may be used to predict the cumulative toxic emissions leaving the main catalyst for various volumetric sizes of the light-off core when the exhaust gas is heated in accordance with the heating strategy. The model may include, for example, a set of partial differential equations. The mathematical model of the treatment system 20 may be solved to obtain the level of toxic emissions from the main catalyst 30 at various times throughout the Federal Test Procedure under the defined heating strategy. Once the model is developed, then sizing the light-off core may include selecting the volumetric size of the light-off core that is associated with the lowest cumulative toxic emissions level obtained from the model solving for the cumulative toxic emissions at the various volumetric sizes of the light-off core when the exhaust gas is heated in accordance with the heating strategy.

If the vehicle includes a hybrid vehicle, the method of treating the flow of exhaust gas may include, in addition to post-crank heating, pre-heating the electric heater 38, i.e., pre-crank heating, prior to starting the internal combustion engine 23. Pre-heating the electric heater 38 reduces the time to bring the main catalyst 30 to the light-off temperature, which increases the efficiency of the exhaust gas treatment system 20.

The method of treating the flow of exhaust gas may further include exothermically oxidizing the CO and the HCs in the exhaust gas with the fixed and pre-determined quantity of the light-off catalyst 34. As described above, the light-off catalyst is disposed downstream of the electric heater 38 and upstream of the main catalyst 30 to generate heat in the exhaust gas prior to reacting with the main catalyst 30 to decrease the time needed to heat the main catalyst 30 to the light-off temperature.

If the vehicle includes a hybrid vehicle, then exothermically oxidizing the CO and the HCs in the exhaust gas with the pre-determined quantity of the light-off catalyst 34 to generate heat may further be defined as exothermically reacting the exhaust gas with the pre-determined quantity of the light-off catalyst 34 to maintain an actual temperature of the light-off catalyst 34 above the light-off temperature of the light-off catalyst 34.

The method of treating the flow of exhaust gas further includes treating the exhaust gas with the main catalyst 30, which is disposed downstream of the light-off catalyst 34, to reduce the toxicity of the exhaust gas as described above.

While the best modes for carrying out the invention have been described in detail, those familiar with the art to which this invention relates will recognize various alternative designs and embodiments for practicing the invention within the scope of the appended claims.

The invention claimed is:

1. A method of treating a flow of exhaust gas from an internal combustion engine of a vehicle, the method comprising:

defining a heating strategy including either pre-crank heating for a pre-determined period of time at a pre-determined power level, post-crank heating for a pre-determined period of time at a pre-determined power level, or a combination of pre-crank heating for a pre-determined period of time at a pre-determined power level and post-crank heating for a pre-determined period of time at a pre-determined power level;

heating the exhaust gas with an electric heater in accordance with the heating strategy;

exothermically oxidizing carbon monoxide and hydrocarbons in the exhaust gas with a pre-determined quantity of a light-off catalyst disposed downstream of the electric heater to generate heat;

treating the exhaust gas with a main catalyst disposed downstream of the light-off catalyst to reduce the toxicity of the exhaust gas; and sizing a light-off core supporting the pre-determined quantity of the light-off catalyst to minimize toxic emissions in the exhaust gas when the exhaust gas is heated in accordance with the heating strategy.

2. A method as set forth in claim 1 wherein the toxic emissions includes either carbon monoxide emissions or hydrocarbon emissions.

3. A method as set forth in claim 1 wherein exothermically oxidizing the carbon monoxide and the hydrocarbons in the exhaust gas with the pre-determined quantity of the light-off catalyst to generate heat is further defined as exothermically oxidizing the carbon monoxide and the hydrocarbons in the exhaust gas with the pre-determined quantity of the light-off catalyst to maintain an actual temperature of the light-off catalyst above a light-off temperature of the light-off catalyst.

4. A method as set forth in claim 1 further comprising disposing the main catalyst on a main core to define a PGM gradient between an upstream end of the main core and a downstream end of the main core such that a higher concentration of the main catalyst is disposed at the upstream end of the main core and a lower concentration of the main catalyst disposed at the downstream end of the main core.

5. A method as set forth in claim 1 wherein sizing the light-off core includes measuring the cumulative toxic emissions leaving the main catalyst for various volumetric sizes of the light-off core when the exhaust gas is heated in accordance with the heating strategy.

6. A method as set forth in claim 5 wherein sizing the light-off core includes selecting the volumetric size of the light-off core that is associated with the lowest cumulative toxic emissions level from the measured cumulative toxic emissions at the various volumetric sizes of the light-off core when the exhaust gas is heated in accordance with the heating strategy.

7. A method as set forth in claim 1 wherein sizing the light-off core includes modeling the operation of the treatment system to predict cumulative toxic emissions leaving the main catalyst for various volumetric sizes of the light-off core when the exhaust gas is heated in accordance with the heating strategy.

8. A method as set forth in claim 7 wherein sizing the light-off core includes selecting the volumetric size of the light-off core that is associated with the lowest cumulative toxic emissions level from the model solving for the cumulative toxic emissions at the various volumetric sizes of the light-off core when the exhaust gas is heated in accordance with the heating strategy.

9. A method of sizing a light-off core for supporting a fixed quantity of a light-off catalyst of an exhaust gas treatment system, the method comprising:
heating the exhaust gas upstream of the light-off core with an electric heater in accordance with a heating strategy;
measuring the cumulative toxic emissions leaving the treatment system for various volumetric sizes of the light-off core when the exhaust gas is heated in accordance with the heating strategy; and
selecting the volumetric size of the light-off core that is associated with the lowest cumulative toxic emission level from the measured cumulative toxic emissions for the various volumetric sizes of the light-off core.

10. A method as set forth in claim 9 wherein the toxic emissions includes one of carbon monoxide emissions or hydrocarbon emissions.

11. A method as set forth in claim 10 further comprising defining a heating strategy.

12. A method as set forth in claim 11 wherein defining a heating strategy includes defining a heating strategy including either pre-crank heating for a pre-determined period of time at a pre-determined power level, post-crank heating for a pre-determined period of time at a pre-determined power level, or a combination of pre-crank heating for a pre-determined period of time at a pre-determined power level and post-crank heating for a pre-determined period of time at a pre-determined power level.

13. A method of sizing a light-off core for supporting a fixed quantity of a light-off catalyst of an exhaust gas treatment system, the method comprising:
heating the exhaust gas upstream of the light-off core with an electric heater in accordance with a heating strategy;
modeling the operation of the gas treatment system to predict the cumulative toxic emissions leaving the treatment system for various volumetric sizes of the light-off core when the exhaust gas is heated in accordance with the heating strategy; and
selecting the volumetric size of the light-off core that is associated with the lowest cumulative toxic emission level obtained from the model solving for the cumulative toxic emissions for the various volumetric sizes of the light-off core.

14. A method as set forth in claim 13 wherein the toxic emissions includes one of carbon monoxide emissions or hydrocarbon emissions.

15. A method as set forth in claim 14 further comprising defining a heating strategy.

16. A method as set forth in claim 15 wherein defining a heating strategy includes defining a heating strategy including either pre-crank heating for a pre-determined period of time at a pre-determined power level, post-crank heating for a pre-determined period of time at a pre-determined power level, or a combination of pre-crank heating for a pre-determined period of time at a pre-determined power level and post-crank heating for a pre-determined period of time at a pre-determined power level.

* * * * *